July 16, 1963 R. D. APPLEGATE 3,097,934
PORTABLE CONTINUOUS DRIER
Filed Aug. 7, 1958 3 Sheets-Sheet 1
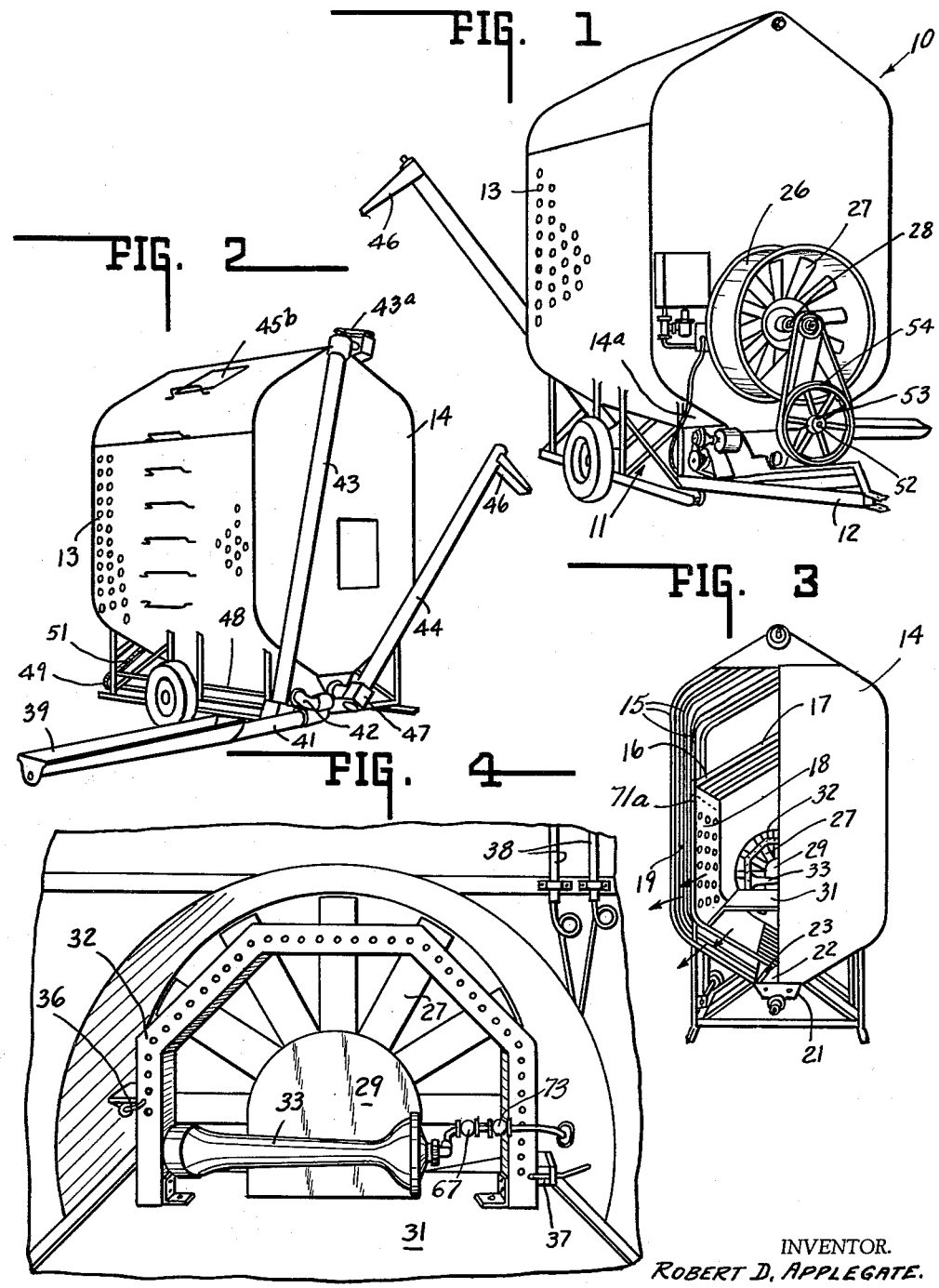
INVENTOR.
ROBERT D. APPLEGATE.
BY
Lockwood, Galt, Woodard & Smith
ATTORNEYS.

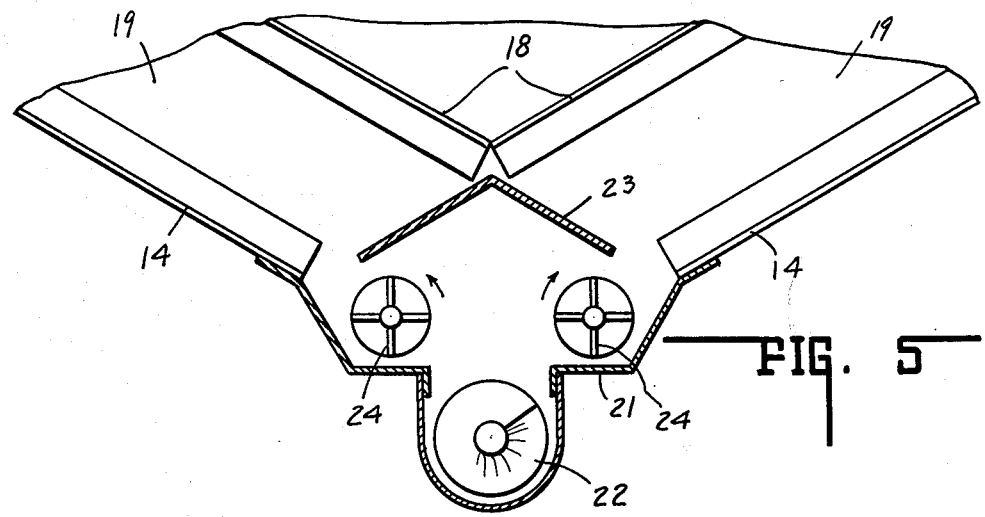
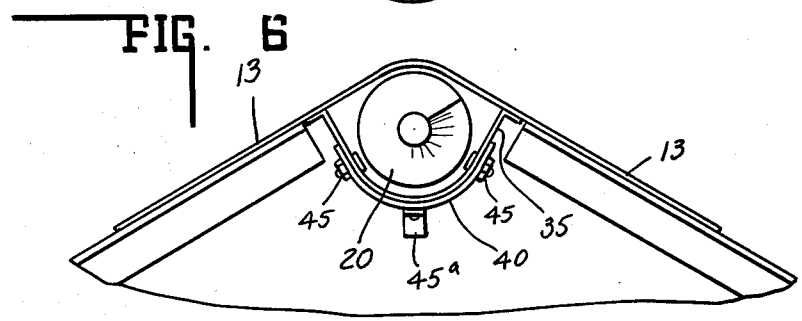
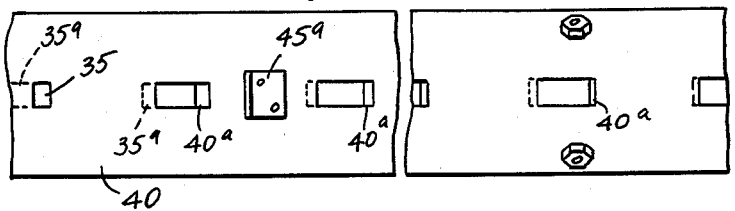
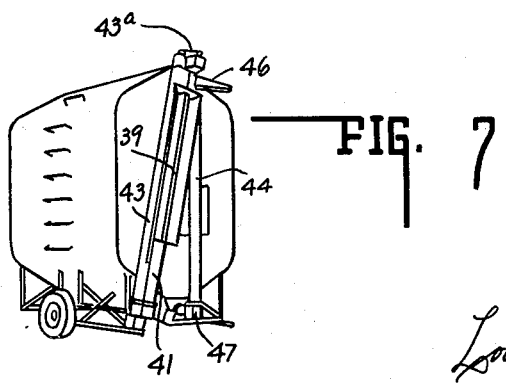
INVENTOR.
ROBERT D. APPLEGATE,
BY
Lockwood, Galt, Woodard & Smith.
ATTORNEYS.

July 16, 1963  R. D. APPLEGATE  3,097,934
PORTABLE CONTINUOUS DRIER

Filed Aug. 7, 1958  3 Sheets-Sheet 3

INVENTOR.
ROBERT D. APPLEGATE.
BY
Lockwood, Galt, Woodard + Smith.
ATTORNEYS.

United States Patent Office 3,097,934
Patented July 16, 1963

3,097,934
PORTABLE CONTINUOUS DRIER
Robert D. Applegate, R.R. 1, Attica, Ind.
Filed Aug. 7, 1958, Ser. No. 753,738
3 Claims. (Cl. 34—55)

This invention relates generally to grain drying apparatus, and in particular to a portable, continuous drier.

In the construction of driers of the type referred to above, it is customary to provide a housing which encloses in spaced relation a perforated liner having the same general configuration as the housing. Means such as a feeding auger are conventionally provided for introducing grain having a high moisture content into the space between the housing and the perforated liner, the grain being introduced at the top of the housing. Means are further provided for removing the grain from the base of the drier. Thus, the grain chamber between the housing and the perforated liner is loaded at its upper end with grain having a high moisture content, the grain filling the space between the housing and liner. As the unloading means at the base of the drier is operated, the grain is lowered through the grain chamber and discharged from the drier. Heated air is introduced into the interior space bounded by the perforated liner and flows therethrough into contact with the grain to be dried as it proceeds through the grain chamber. The grain is thus discharged from the grain chamber with its moisture content substantailly lowered.

One desirable feature for grain driers of the type referred to is that provided by the introduction of unheated or cooling air into the grain in the last portion of its travel through the grain chamber. The resulting lowering of the temperature of the dried grain permits it to be handled more conveniently after its discharge from the drier. In my copending application Serial No. 689,679, filed October 11, 1957, entitled "Continuous Drier," there is disclosed a drier which utilizes a separate fan for forcing cooling air through the grain, this fan being in addition to the fan for introducing heated air into the drier.

It is the principal object of the present invention to provide a continuous drier utilizing a single fan having its air flow split to introduce both heated air and cooling air into the drier.

A further object of the present invention is to provide a grain drier which is portable and which is provided with a dump or loading receptacle and a discharge spout, both of which are movable to stowed position when the drier is to be moved or transported.

A further object of the present invention is to provide a continuous grain drier having dual auger plates cooperating with its feeding auger, the auger plates having adjustable registering apertures therein to control the output of the feeding auger.

A further object of the present invention is to provide a continuous grain drier wherein the air flow created by its delivery is split with one component being directed past an auxiliary burner which provides heat during the initial running period of the air flow to deliver only heated air to the grain.

The full nature of the invention will be understood from the accompanying drawings and the following description and claims:

FIG. 1 is a perspective view of a grain drier embodying the present invention.

FIG. 2 is a perspective view of the drier taken from the end opposite that shown in FIG. 1.

FIG. 3 is an end view of the drier with a portion of the housing end wall removed.

FIG. 4 is an enlarged view of a portion of the fan showing the placement of the grain burner.

FIG. 5 is a detailed view showing the arrangement of the unloading means.

FIG. 6 is an enlarged, fragmentary view showing the loading auger and its casing.

FIG. 6A is a fragmentary bottom plan view of the auger casing.

FIG. 7 is a perspective view of the drier with the trough and spout in stowed position.

Figure 8:
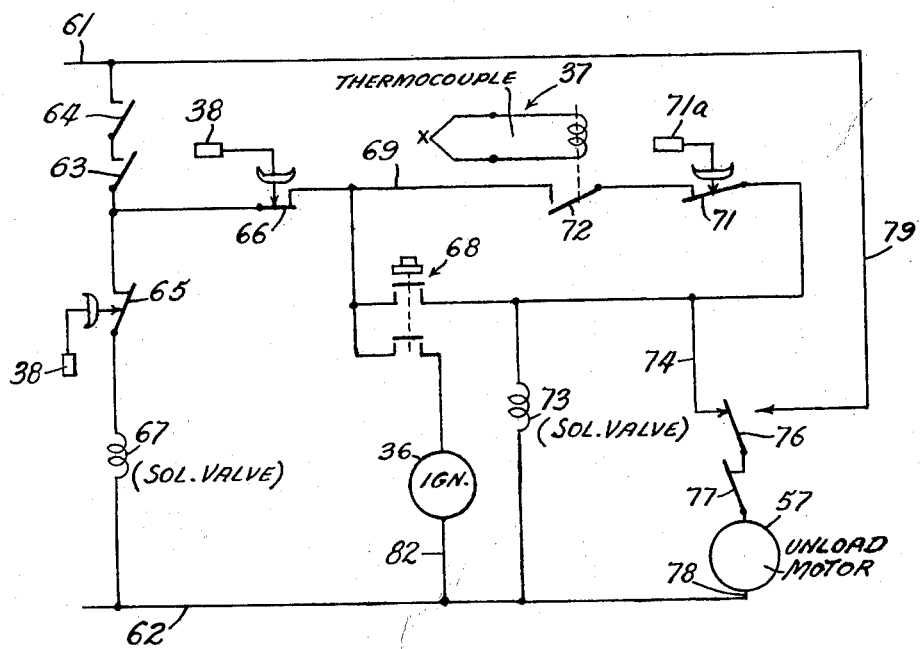
FIG. 8 is a schematic wiring diagram of the control circuit for the drier.

Referring initially to FIG. 1, there is shown generally at 10 a housing supported upon a wheeled base structure indicated generally at 11. The base structure is provided with a towing hitch 12 by means of which the drier may be transported. The housing is shaped so as to have a top area and base area which are generally triangular in cross section separated by side walls 13 and end walls 14. The side walls 13 are provided with minute perforations whereby grain will be retained by the side walls but air may flow therethrough.

As may be seen in FIG. 3, the housing is formed by attaching plates to properly shaped angle irons 15. Extending between the end walls of the housing is a liner 16 having a peaked, closed top 17 and perforated side walls 18.

Extending through the housing adjacent its peaked upper margin is a feeding or loading auger 20 (FIG. 5), which is enclosed by an auger casing having registering apertures therein, the casing being shown in detail in FIG. 6. The function of the loading auger is to distribute incoming grain evenly throughout the length of the drier, the space between the top 17 of the liner and the top of the housing forming a bin from which grain is fed into the grain chamber 19 formed between the side walls of the housing and the liner sidewalls 18. As may be seen in both FIGS. 3 and 5, the liner and the housing side walls terminate short of their lower apex and the gap thereby formed is closed by a housing 21 which encloses an unloading auger 22 extending the length of the housing. The upper side of the auger 22 is covered by a plate 23 which is V-shaped in cross-section and extends adjacent a pair of fluted rolls 24 which are supported for rotation by the housing 21 and extend parallel to the unloading auger. The rolls are rotated in opposite directions, as indicated in FIG. 5, and in operation provide a positive means for feeding grain from the grain chamber into the unloading auger.

As will be apparent in FIG. 1, one end wall of the housing accommodates a fan shroud 26 which encloses a fan 27 adapted to produce air flow into the space enclosed by the liner. The inner end of the shaft 28 mounting the fan is journaled in a member 29 shown in FIG. 4, the member 29 being provided with a streamlined configuration to minimize turbulence in the air flow created by the fan. A plate 31, which extends horizontally through the liner, divides the air flow induced by the fan into an upper component and a lower component. The plate 31 additionally supports a gas burner 32 having a mixing tube 33 into which gas is introduced through the tube 34. The burner is provided with a conventional hot-wire ignition means 36 and a thermocouple 34 which form a part of a conventional safety switch. The burner 32 is positioned in the upper component of the air flow, and, when ignited, serves to heat this portion of the air flow to the temperature required for drying the grain proceeding through the grain chamber. As may be seen in FIG. 4, the upper portion of the liner also has mounted therein the temperature responsive bulbs 38 of a conventional thermostat and high temperature limit control which will be subsequently described with reference to FIG. 8.

Referring to FIGS. 6 and 6A, the casing for the loading auger 20 includes an inner arcuate plate 35, extending the length of the housing, and provided with flanged longitudinal edges to facilitate its attachment to the housing side walls. An outer plate 40, arcuate in cross-section, closely fits around the lower portion of plate 35 and is coextensive therewith. Bolts 45 extend through appropriate slots in the plate 35 and, when loosened, permit the outer plate 40 to be moved relative to the plate 35, the abutment 45a on the outer plate providing a means for producing this relative movement between the plates. The bolts and abutment are accessible through the removable access door indicated at 45b in FIG. 2.

As may be seen in FIG. 6A the base of the lower plate 40 is provided with a series of uniformly spaced and uniformly sized rectangular apertures 40a. These apertures are in adjustable register with rectangular apertures 35a in the plate 35. The apertures 35a differ from the apertures 40a in that they are of gradually increasing size from left to right in FIG. 6A, that is, from the inlet end of the auger casing. As may be seen in FIG. 6A, the registering portions of the apertures 35a and 40a provide openings through which grain may be metered to the area between the housing and the lining. The openings are of gradually increasing size along the length of the casing and thus tend to maintain the grain brought into the casing by auger 20 evenly distributed over the casing base. It will be understood that by adjusting the plate 40 with relation to the plate 35 the size of the openings provided by the registering portions of apertures 35a and 40a may be uniformly varied to accommodate various types of grain. It will be further understood that other forms of progression of the size of the apertures 35a might be utilized to provide varying grain openings along the length of the casing as required by the type of grain or drying conditions encountered.

FIG. 7 shows the drier with its various augers in stowed position, the drier being then ready for transport by towing or other suitable means. As may be seen by comparing FIGS. 2 and 7, the trough 39 and attached auger 41 may be pivotally moved to a position generally paralleling the auger 43, and the auger 44 may be raised from its inclined position of FIG. 2 to a generally vertical position, as shown in FIG. 7. The augers 41 and 44 may be fastened in stowed position by any suitable means, and, when so secured, lie within the transverse outline of the housing thus making the drier safe for towing on highways.

The means for conveying the grain to be dried to the loading auger is shown in FIG. 2, and includes a trough 39 into which grain may be emptied from a container or storage bin. The trough overlies a generally horizontal auger 41 whose inner end feeds the grain to a short horizontal auger 42 which in turn feeds the generally upright auger 43. At its upper end the auger shaft protrudes through a fitting capping its tube. A chain drive 43a from the auger shaft provides the necessary rotation for the loading auger which extends through the upper end of the housing. The unloading auger 22 extends within its enclosing tube beyond the end of the housing and feeds the auger 44 which is provided with a conventional spout assembly 46 at its upper end. The gear box 47 at the junction of the unloading auger 22 and the auger 44 provide the necessary change in direction of the axis of rotation of the augers for discharging the grain at the spout.

The drive for the augers other than augers 22 and 44 is provided by a line shaft 48 having a conventional mechanical hand clutch (not shown). The line shaft extends adjacent the base of the housing and at its remote end carries a sprocket 49 which is driven by a chain 51 linking the line shaft to a drive shaft 52 shown in FIG. 1. The drive shaft is provided with a coupling 53, which is adapted to be connected to the power take-off shaft of a tractor, to an electric motor, or other similar drive means (not shown).

The drive shaft also carries a pulley 54 which is belted to the fan shaft 28. Rotation of the drive shaft by an external power means thus causes rotation of the fan 27 and, if the clutch is engaged, provides for rotation of the augers through the line shaft.

An electric motor 57 drives a speed-reducing pulley assembly whose output is coupled to the fluted rolls 24. The motor is provided with a conventional adjustable speed mounting so that the speed of rotation of the fluted rolls can be fixed at a value suitable for the particular type of grain being dried. The unloading auger 22 which extends along the base of the housing is coupled by means of a sprocket and chain (not shown) to the drive shaft 52, rotation of auger 22, as previously mentioned, serving to drive the auger 44.

The wiring circuit for the drier is shown in FIG. 8 and includes power input leads 61 and 62. The input lead 61 is connected to one side of an on-off switch 63 through a sail switch 64. The sail switch is of a conventional type and assures that there is air flow into the drier before the burner 32 can be ignited. The on-off switch 63 supplies power to one side of a conventional remote bulb thermostat 65 and to one side of a conventional remote bulb high limit control 66, the bulbs for these controls being identified at 38 in FIG. 4. The thermostat when closed supplies power to a solenoid valve 67 which controls the flow of gas to the burner 32. The high limit switch 66 is connected to the indicated contacts of a conventional push-button switch 68 and by means of a wire 69 to one side of a remote bulb temperature control 71. The temperature control 71 is operated by a bulb 71a located in the grain chamber and opens whenever this bulb becomes overheated, indicating that grain has jammed in the grain chamber. The function and operation of this control is disclosed and claimed in the above-identified copending application. The temperature control 71 is connected to one side of a thermo-pilot switch 72 of the automatic reset type. This switch is of a conventional type having an operator 37 operated by a thermocouple mounted so as to be heated by the flame from the burner, the electrical energy generated by the thermocouple, causing the switch 72 to close. Switch 72 is reopened whenever the burner 32 is extinguished.

Closure of switch 72 provides power to a solenoid safety valve 73, which also controls the flow of gas to the main burner. A wire 74 extending from the switch 72 supplies power to one side of a double throw, single pole, manual switch 76. The common switch element of the switch 76 is connected through an unloader motor switch 77 to one side of the unloader motor previously identified at 57 in FIG. 1. The other side of the unloader motor is connected to the power lead 62 by a wire 78. A wire 79 connects the power input lead 61 to one side of the manual switch 76. The igniter 36 provides ignition for the burner 32 in conventional fashion and is connected by a wire 82 to the power lead 62. The opposite side of the ignition transformer is connected to the indicated contact of the push-button switch 68. As may be seen from the circuit diagram, closure of the switch 68 completes the power connection to the ignition transformer through the high temperature limit control 66.

The operational sequence for igniting the burner will now be described with reference to FIG. 8. Assuming the fan is rotated by the external source of mechanical power through the drive shaft 52, the said switch 64 will be closed. Manually holding the push button switch 68 closed supplies power to the valve 73, assuming that the on-off switch 63 has already been manually closed. Since thermostat 64 will be closed under these conditions, the valve 67 will also be energized, supplying gas to the main burner. As long as switch 68 is held closed, the ignition transformer 81 will also be energized to ignite the main burner. After the burner has been ignited, the thermocouple mounted at the burner will cause switch 72 to close providing a holding circuit for the valve 73 through the normally closed control 71. The switch 68 may then be released to move to open position, de-energizing the ignition transformer. The unloading motor may be started independently of this sequence by means of the switch 76. Movement of the switch 76 to close its normally open terminal provides a means for operating the unloader motor independently of the other circuit components. It should be noted that, with switch 68 released or open, unloader motor 57 is connected to the power line 61 through switches 71 and 72 in series so that the unloader is dropped out whenever temperature control 71 indicates clogging of grain or when there is a flame-out, indicated by the opening of switch 72. This electrical interlock prevents undesirable operation of the unloader motor 57 during the existence of these malfunctions.

In operation, the various augers serve to continuously load the space above the liner with grain which is to be dried, the grain traveling through the grain chamber between the side walls of the liner and the housing. The feeding rollers 24 and the unloading auger remove the grain from the drier at the completion of its travel therethrough. As the grain moves through the upper portion of its downward travel between the liner and housing side walls, the hot air provided by the fan and burner 32 enters the grain column through the perforated liner and reduces the moisture content of the grain, the air being then discharged through the perforated side walls 13 as indicated by arrows in FIG. 3. As the dried grain traverses the portion of its travel below the plate 31, the unheated component of the air flow induced by the fan 27 serves to lower the temperature of the grain prior to its entry into the unloading auger, this cooling air also exiting from the drier through the side wall perforations. As may be seen in FIG. 1, the end wall 14 is provided with an extending section 14a, which prevents the spent cooling air from re-entering the lower section of the fan intake shroud 26. Inefficient recirculation of the cooling air is thus prevented. The dividing of the air flow into heated and unheated components thus permits the utilization of a single fan to provide both drying and subsequent cooling of the grain.

Figure 9:
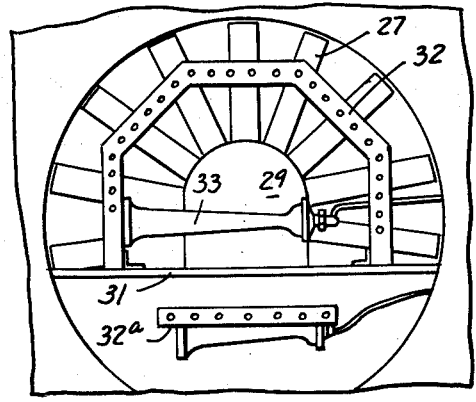
FIG. 9 is a detailed view of a modified form of a portion of the drier which utilizes an auxiliary burner.

A modified arrangement for the burner and fan assembly is shown in FIG. 9. In this modified form an auxiliary burner 32a is mounted adjacent the fan but below the plate 31. The auxiliary burner may be ignited by a separate igniting means or may be ignited directly from the main burner. The gas supply to this auxiliary burner, however, is controlled independently of the gas supply to the main burner. The function of the auxiliary burner is to provide heated air to the lower portion of the main column for an interval at the start of the drier.

In the operation of this modified form, the fan and main burner are started as previously described. The auxiliary burner 32a is also ignited. Because the space between the lining side walls and the housing side walls is completely filled, initially, with undried grain, unless the lower portion of the grain chamber is also supplied with heated air, the initial output of the drier will consist of undried grain.

By igniting auxiliary burner 32a for the period required to dry the grain between the liner and the housing and below the plate 31 and by delaying the operation of the fluted rolls until this period has elapsed, this initial output of the drier may be effectively processed. As soon as the discharge of grain from the drier begins, the auxiliary burner 32a may be extinguished and the component of the air flow below the plate 31 may then assume its cooling function as previously described.

While the invention has been disclosed and described in some detail in the drawings and foregoing description, they are to be considered as illustrative in character, as other modifications may readily suggest themselves to persons skilled in this art and within the broad scope of the invention, reference being had to the appended claims.

The invention claimed is:

1. A portable continuous grain drier comprising a housing, means for supplying heated air to the housing comprising a power driven fan mounted at one end of said housing and heating means mounted adjacent said fan, a liner extending between the end walls of said housing and having perforated side walls spaced from the housing side walls, loading means for metering grain into the space between the adjacent side walls of said housing and liner, said loading means comprising a generally horizontally disposed auger assembly extending within said housing and adapted to receive grain at one end thereof, an auger casing including inner and outer nested plates adapted to be adjustably displaced relative to each other, said inner and outer plates having a series of apertures adapted to be placed in adjustable register to provide grain metering openings, the apertures in said outer plate being of uniform size and the apertures in said inner plate being of graduated increasing size from said grain-receiving end of said auger assembly, whereby grain may accumulate evenly along the length of said casing for metering through said openings.

2. A portable continuous grain drier comprising a housing, means for supplying heated air to the housing comprising a power driven fan mounted at one end of said housing and heating means mounted adjacent said fan, a liner extending between the end walls of said housing and having perforated side walls spaced from the housing side walls, loading means for metering grain into the space between the adjacent side walls of said housing and liner, said loading means comprising a generally horizontally disposed auger assembly extending within said housing and adapted to receive grain at one end thereof, an auger casing including inner and outer nested plates adapted to be adjustably displaced relative to each other, each of said plates having a series of apertures adapted to be placed in adjustable register to provide grain metering openings, the apertures in one of said plates being of uniform size and the apertures in the other of said plates being of graduated increasing size, from said grain-receiving end of said auger assembly, whereby grain may accumulate evenly along the length of said casing for metering through said openings.

3. A portable continuous grain drier comprising a housing, a liner extending between the end walls of said housing and having perforated side walls spaced from the housing sidewalls, loading means for metering grain into the space between the adjacent side walls of said housing and liner, unloading means at the base of said housing for removing grain therefrom, said unloading means comprising an unloading auger assembly, an electric motor for driving said auger and a source of electrical power therefor, fan means for passing air through said space between the side walls of said liner and said housing, heating means for raising the temperature of the air so passed, and control means for shutting down said auger driving motor upon either a failure of said heating means or upon a predetermined temperature rise of said space between the liner and housing, said control means including a first switch closed in response to the production of heat by said heating means and a second switch normally closed but opened upon a predetermined temperature rise of said space between said liner and housing, said first and second switches being connected in series between said power source and said auger driving motor.

References Cited in the file of this patent

UNITED STATES PATENTS

| | | |
|---|---|---|
| 1,157,172 | Morris | Oct. 19, 1915 |
| 1,502,858 | Little | July 29, 1924 |
| 2,062,192 | Behr et al. | Jan. 26, 1937 |
| 2,701,920 | Campbell | Feb. 15, 1955 |
| 2,703,193 | Seltzer | Mar. 1, 1955 |
| 2,706,345 | Arndt | Apr. 19, 1955 |
| 2,715,781 | Sproul | Aug. 23, 1955 |
| 2,732,630 | Markowich | Jan. 31, 1956 |
| 2,858,620 | Naylor | Nov. 4, 1958 |
| 2,991,559 | Pierpoint | July 11, 1961 |
| 3,000,110 | Forth et al. | Sept. 19, 1961 |